Patented Apr. 7, 1925.

1,532,227

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCT OBTAINED THEREBY.

No Drawing. Original application filed April 1, 1922, Serial No. 548,826. Divided and this application filed April 1, 1922. Serial No. 548,829.

*To all whom it may concern:*

Be it known that I, SIDNEY M. CADWELL, a citizen of the United States, residing at Leonia, county of Bergen, and State of New Jersey, have invented certain new and useful Improvements in Processes for Vulcanizing Rubber and Products Obtained Thereby, of which the following is a full, clear, and exact description.

This invention relates to vulcanizing rubber and similar materials and products obtained thereby, being more particularly directed to acceleration of vulcanization by a class of organic accelerators and products resulting from such vulcanization.

This case is a division of application Serial No. 548,826 filed April 1, 1922.

One object of the invention is to provide a process of the kind mentioned employing accelerators obtainable from inexpensive raw materials by a simple method. Another object of the invention is to provide a process in which accelerators of the kind mentioned may be readily compounded with rubber, or similar material, which shall permit of the carrying out of vulcanization at ordinary temperatures, in masses of rubber or in thin sheets, while avoiding the generation of acids during the process of vulcanization, as, for example, takes place when sulphur chloride is used. Another object is to provide a series of products having generally desirable physical characteristics, such as high tensile strength, resistance to ageing, resistance to flexing, etc., and which shall be substantially free from the odor of the vulcanizing ingredients employed. Other objects will in part be obvious and in part pointed out hereinafter.

The invention accordingly consists broadly in the process, and product obtained therefrom, for treating rubber and similar materials, which comprises subjecting the rubber to a vulcanizing agent and a substance containing the radical $$\overset{\text{RCSM,}}{\underset{\text{X}}{\|}}$$

and vulcanizing the rubber. In this formula, R represents any element subject to the limitation mentioned hereinafter; M represents a salt-forming element or group or hydrogen, such as zinc, ammonium, etc., and is designated as representing a metal or being metallic, or a radical $$\underset{\text{X}}{\overset{\text{SCR}}{\|}} \text{ or a radical } \underset{\text{X}}{\overset{\text{CR;}}{\|}}$$

and X represents any bivalent element or radical, such as sulphur, oxygen, etc., subject to the limitation mentioned later.

It will be seen that the substances containing the radical fall into three groups corresponding to the three said significations of M. In the first two groups the symbol $$\underset{\text{X}}{\overset{\text{R in RCSM}}{\|}}$$

is limited to any element except nitrogen; in the third group where M represents $$\underset{\text{X}}{\overset{\text{CR}}{\|}}$$

this limitation is absent. In the table herein shown forming part of the specification, there is shown the broad group containing the radical $$RCSM,\overset{\|}{X}$$

sub-divided into three smaller groups which are respectively $$\underset{\substack{M=\text{Metal},\\ \text{etc.}}}{RCSM,\overset{\|}{X}} \quad \underset{M=SCR}{RCSSCR,\overset{\|}{X}\overset{\|}{X}} \quad \underset{M=CR\overset{\|}{X}}{RCSCR.\overset{\|}{X}\overset{\|}{X}}$$

It will be noted that the group formulæ represent generally derivatives of carbon oxysulphide or carbon disulphide.

The formulæ of the first two groups mentioned, in which the first symbol R is any element except nitrogen, may be written $$R'CSM,\overset{\|}{X}$$

under which fall $$R'CSM,\overset{\|}{X}$$

where M is the metal and thiol salts are included, and $$R'CSSCR,\overset{\|}{X}\overset{\|}{X}$$

where M is equal to $$SCR\overset{\|}{X}$$

and the disulphides are represented. R' in these formulæ designate any element except nitrogen.

In employing the first group of those mentioned above including substances having the formula $$R'CSM,\overset{\|}{X}$$

it has been found that M preferably represents either zinc or mercury in the mercuric state when vulcanization at ordinary temperatures is carried out, and when vulcanization above ordinary temperatures, the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state, so that the preferred formula for the thiol salts is $$R'CSM'\overset{\|}{X}$$

where M' represents one of the preferred metals given. M' may be substituted by any metal provided that one of the metals just mentioned is present in the combination, either at some other position in the formula including R'

$$R'CSM\overset{\|}{X}$$

or be introduced otherwise than as part of this compound. In connection with the other groups mentioned, namely, those represented by the formulæ

$$R'CSSCR\overset{\|}{X}\overset{\|}{X}$$

and $$RCSCR\overset{\|}{X}\overset{\|}{X}$$

constituting respectively the disulphide and monosulphide groups, the presence of zinc or mercury in the mercuric state is preferable when vulcanization at ordinary temperatures is carried out. When vulcanization above ordinary temperatures is carried out the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state. As noted in connection with the first group, the metals employed with groups 2 and 3 may be present in any combined form.

In the table mentioned above, R and X are shown as represented by carbon, oxygen, nitrogen and sulphur, which are four of the more important elements occurring in organic compounds.

It will be understood that the invention is not limited to the species shown in the accompanying table, and that by substituting other elements than nitrogen, carbon, oxygen and sulphur for the symbol R or X, various other species may be formulated falling within the scope of the invention.

Although the various species disclosed are represented as symmetrical, it will be understood that unsymmetrical species also fall within the limits of the invention.

The table is:—

1,532,227

RCSM
$\|$
X

Group I.

R'CSM
$\|$
X
M Metal
Thiol salts

| 1. OCSM $\|$ S | 2. OCSM $\|$ O | 3. OCSM $\|$ NR | 4. OCSM $\|$ CH$_2$ |
| 5. CCSM $\|$ S | 6. CCSM $\|$ O | 7. CCSM $\|$ NR | 8. CCSM $\|$ CH$_2$ |
| 9. SCSM $\|$ S | 10. SCSM $\|$ O | 11. SCSM $\|$ NR | 12. SCSM $\|$ CH$_2$ |
| 13. NCSM $\|$ S | 14. NCSM $\|$ O | 15. NCSM $\|$ NR | 16. NCSM $\|$ CH$_2$ |

Group II.

R'CSSCR
$\|$ $\|$
X X
M=SCR
$\|$
X
Disulphides

| 17. OCSSCO $\|$ S | 18. OCSSCO $\|$ O | 19. OCSSCO $\|$ NR NR | 20. OCSSCO $\|$ CH$_2$CH$_2$ |
| 21. CCSSCC $\|$ S | 22. CCSSCC $\|$ O | 23. CCSSCC $\|$ NR NR | 24. CCSSGC $\|$ CH$_2$CH$_2$ |
| 25. SCSSCS $\|$ S | 26. SCSSCS $\|$ O | 27. SCSSCS $\|$ NR NR | 28. SCSSCS $\|$ CH$_2$CH$_2$ |
| 29. NCSSCN $\|$ S | 30. NCSSCN $\|$ O | 31. NCSSCN $\|$ NR NR | 32. NCSSCN $\|$ CH$_2$CH$_2$ |

Group III.

RCSCR
$\|$ $\|$
X X
M=CR
$\|$
X
Monosulphides

| 33. OCSCO $\|$ S | 34. OCSCO $\|$ O | 35. OCSCO $\|$ NR NR | 36. OCSCO $\|$ CH$_2$CH$_2$ |
| 37. CCSCC $\|$ S | 38. CCSCC $\|$ O | 39. CCSCC $\|$ NR NR | 40. CCSCC $\|$ CH$_2$CH$_2$ |
| 41. SCSCS $\|$ S | 42. SCSCS $\|$ O | 43. SCSCS $\|$ NR NR | 44. SCSCS $\|$ CH$_2$CH$_2$ |
| 45. NCSCN $\|$ S | 46. NCSCN $\|$ O | 47. NCSCN $\|$ NR NR | 48. NCSCN $\|$ CH$_2$CH$_2$ |

M Metal Thiol Salts

In general, it is to be noted in connection with this group, that its members are able to accelerate both hot vulcanization, that is, vulcanization at or above 240° F. and vulcanization below such temperatures, and that they may be used for such vulcanization in thick masses of rubber, in thin sheets, or in cements.

The general procedure for vulcanizing employing members of this group is as follows:—100 parts of rubber, 10 parts zinc oxide, 3 parts of sulphur, and 0.1–3.0 parts of accelerator are mixed. If hot vulcanization is employed the usual temperatures or lower may be used for periods of thirty minutes or more to complete vulcanization. The normal or usual temperatures of hot vulcanization are 240° F. or above. If cold vulcanization is desired the mixed materials may be allowed to stand at ordinary room temperature for a week or less, when vulcanization is complete. The procedure given above may be employed with thin or thick masses of rubber, and in the case of cements where a solvent is used with the mixture, the procedure after mixing and evaporation of the solvent, is substantially identical with that employed for thin masses of rubber. The use of materials of this group, in the manner indicated above, will secure cold vulcanization without added bases or amines, but if such bases or amines are added, the vulcanization is accelerated.

The action of the addition of amines to materials of this class has been found to be as follows:—The acceleration by aliphatic amines is greatest when approximately a half molecular weight of the amine on the basis of the carbon disulphide content of the thiol salt is used. An excess of primary aliphatic amine retards the cure considerably. An excess of secondary aliphatic amine retards the cure less and an excess of tertiary aliphatic amine has practically no retarding effect. The greater the amount of primary aromatic amine added the greater the acceleration. Dibenzyl amine has given excellent results in the acceleration of vulcanization according to the invention. Aniline has also given good results. Bases such as sodium hydroxide also accelerate the action of thiol salts.

The thiol salts are particularly adapted to be used in connection with cold curing and cements. It will be understood of course as pointed out above that they may be used in hot vulcanization and otherwise as desired. The members of the group are preferably employed with substances containing combined zinc, preferably zinc oxide, or one of the metals in combination hereinbefore enumerated. The oxides are generally designated as M'O.

*Species 1.*

The following members of this species have been employed to give good results in connection with the process included in the invention:

Barium ethylxanthogenate

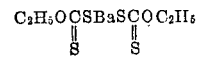

Sodium methylxanthogenate

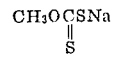

Lead methylxanthogenate

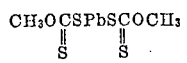

Zinc methylxanthogenate

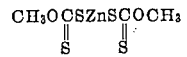

Lithium ethylxanthogenate

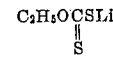

Magnesium ethylxanthogenate

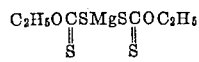

Calcium ethylxanthogenate

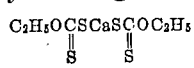

Ammonium ethylxanthogenate

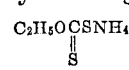

Potassium ethylxanthogenate

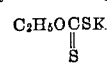

Sodium ethylxanthogenate

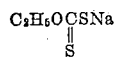

Ferric ethylxanthogenate

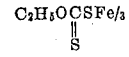

Lead ethylxanthogenate

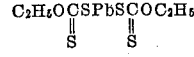

Mercuric ethylxanthogenate

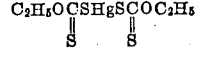

Potassium amylxanthogenate

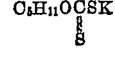

Zinc amylxanthogenate

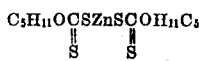

Zinc ethylxanthogenate

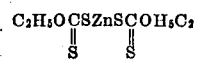

Zinc butylxanthogenate

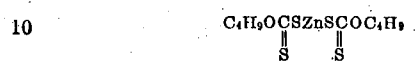

The above members are disclosed and claimed in co-pending applications Serial Nos. 548,826 and 548,827, filed April 1, 1922.

*Species 2.*

The following members of this species have been employed to give good results in connection with the process included in the invention:—

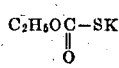

Ethyloxyester of potassium thiolcarbonate

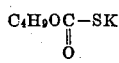

Butyloxyester of potassium thiolcarbonate

*Species 3.*

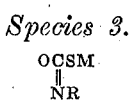

The following members of this species have been employed to give good results in connection with the process included in the invention:—

Ethyl ester of allyl thiocarbamic acid $$CH_2=CH-CH_2NH$$
$$\diagdown$$
$$C=S$$
$$\diagup$$
$$C_2H_5O$$

Ethyl ester of phenylthiocarbamic acid $$C_6H_5NH$$
$$\diagdown$$
$$C=S$$
$$\diagup$$
$$C_2H_5O$$

Butyl ester of phenylthiocarbamic acid $$C_6H_5NH$$
$$\diagdown$$
$$C=S$$
$$\diagup$$
$$C_4H_9O$$

*Species 5.*

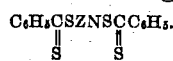

The preferred member of this species is zinc dithiobenzoate having the formula $$C_6H_5CSZNSCC_6H_5.$$
$$\parallel \quad \parallel$$
$$S \quad S$$

In employing this material the following procedure is carried out: 100 parts of rubber are mixed with 10 parts zinc oxide, 3 parts sulphur, 1/10 part zinc dithiobenzoate and vulcanization is accomplished in a mold under 40 lbs. steam pressure for 30 minutes.

Zinc dithiobenzoate may be prepared by a standard method to be found in the literature. This method consists in dissolving brombenzol in dry ethyl ether and the solution is treated with magnesium turnings. After completion of the reaction, carbon bisulphide is added and the solution thus obtained is treated with water. The solution is extracted with ether and the ether solution is extracted with sodium carbonate solution in water. This solution is treated with zinc acetate and the zinc dithiobenzoate separates as crystals and may be recovered. For vulcanization at a temperature below the ordinary hot vulcanizing temperature, such as at ordinary room temperature, 70° F. approximately, the following procedure is carried out: 100 parts of rubber, 10 parts of zinc oxide, 3 parts of sulphur, 3 parts of zinc dithiobenzoate, 2 parts of para toluidine are mixed on the mill and allowed to remain at ordinary room temperature for a week or less whereupon satisfactory vulcanization is effected.

As a specific example of the use of a member of this species in the form of a cement, the following procedure is preferably carried out:—100 parts of rubber, 20 parts of zinc oxide, and 6 parts of zinc dithiobenzoate are mixed on the mill in the usual manner and subsequently mixed with 800 parts of benzol, thus forming one component of the self-curing cement; 100 parts of rubber, 3 parts of dibenzylamine, and 6 parts of sulphur are mixed on the mill in the usual manner and subsequently mixed with 800 parts of benzol to form the second component of the self-curing cement. Neither of these component cements alone will cure quickly at ordinary or elevated temperatures. If equal parts of the component cements are mixed, the resulting cement will cure in from 16 to 48 hours at ordinary room temperatures, or in a shorter time at elevated temperatures. If the solvent is allowed to evaporate from the cement the resulting rubber will cure in from 16 to 48 hours at ordinary room temperatures, say 70° F. or at an elevated temperature, say 160° F. in the course of from 1 to 2 hours.

Other members of this species which have been employed to give good results in connection with the process of the invention are:—

Lead dithiophenylacetate

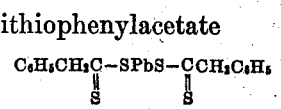

or
Lead dithiobenzoate $$C_6H_5\underset{\underset{S}{\|}}{C}-SPbS-\underset{\underset{S}{\|}}{C}C_6H_5$$

or
Cadmium dithiobenzoate $$C_6H_5\underset{\underset{S}{\|}}{C}-SCdS-\underset{\underset{S}{\|}}{C}C_6H_5$$

or
Mercurous dithiobenzoate $$C_6H_5\underset{\underset{S}{\|}}{C}-SHg$$

or
Cupric dithiobenzoate $$C_6H_5\underset{\underset{S}{\|}}{C}-SCuS-\underset{\underset{S}{\|}}{C}C_6H_5$$

or
Potassium dithiobenzoate $$C_6H_5\underset{\underset{S}{\|}}{C}-SK$$

or
Lead dithioacetate $$CH_3\underset{\underset{S}{\|}}{C}-SPbS-\underset{\underset{S}{\|}}{C}CH_3$$

or
Lead dithiobrombenzoate $$BrC_6H_4\underset{\underset{S}{\|}}{C}-SPbS-\underset{\underset{S}{\|}}{C}C_6H_4Br$$

Species 6.

$$\underset{\underset{O}{\|}}{CCSM}$$

The following members of this species have been employed to give good results in connection with the process included in the invention:—

Lead thiobenzoate $$C_6H_5\underset{\underset{O}{\|}}{C}-SPbS-\underset{\underset{O}{\|}}{C}C_6H_5$$

Potassium thioacetate $$CH_3\underset{\underset{O}{\|}}{C}SK$$

Lead thiobutrate $$C_3H_7\underset{\underset{O}{\|}}{C}-SPbS-\underset{\underset{O}{\|}}{C}C_3H_7$$

Species 7.

$$\underset{\underset{NR}{\|}}{CCSM}$$

The following members of this species have been employed to give good results in connection with the process included in the invention:—

Thiobenzamide $$C_6H_5\underset{\underset{S}{\|}}{C}NH_2$$

Thiobenzanilide $$C_6H_5\underset{\underset{S}{\|}}{C}NHC_6H_5$$

Species 9.

$$\underset{\underset{S}{\|}}{SCSM}$$

The following members of this species have been employed to give good results in connection with the process included in the invention:—

C₂S₇Co₂(NH₃)₆  K. A. Hoffman & Hochtlen Berichte 36, 1146 (1903) cobalto ammonium trithiocarbonate
CS₃CuNH₄  cuproammoniumtrithiocarbonate (same ref.)
K₂CS₃  potassium trithiocarbonate Basic calcium trithiocarbonate $$Ca(OH)_2CaCS_3$$

Species 10.

$$\underset{\underset{O}{\|}}{SCSM}$$

The following member of this species has been employed to give good results in connection with the process included in this invention:—

Zinc dithiocarbonate $$ZnCOS_2$$

Species 13.

$$\underset{\underset{S}{\|}}{NCSM}$$

The members of this class include:
Potassium orthomethylphenylenedithiocarbamate $$o-CH_3.C_6H_4NH.\underset{\underset{S}{\|}}{C}-S-K$$

Ammonium para-aminophenylenedithiocarbamate $$p\ NH_2C_6H_4NH\underset{\underset{S}{\|}}{C}-SNH_4$$

Ammonium phenylethyldithiocarbamate $$\underset{C_2H_5}{\overset{C_6H_5}{>}}N-\underset{\underset{S}{\|}}{C}-SNH_4$$

Potassium para-aminophenylenedithiocarbamate $$p\ NH_2C_6H_4NH-\underset{\underset{S}{\|}}{C}-SK$$

Zinc para-aminophenylenedithiocarbamate $$p\ NH_2C_6H_4NH\underset{\underset{S}{\|}}{C}-S-Zn-S-\underset{\underset{S}{\|}}{C}NHC_6H_4NH_2\ p$$

Zinc ethylphenyldithiocarbamate $$\underset{C_2H_5}{\overset{C_6H_5}{>}}N\underset{\underset{S}{\|}}{C}SZnS\underset{\underset{S}{\|}}{C}N\underset{C_2H_5}{\overset{C_6H_5}{<}}$$

Ammonium benzidyldithiocarbamate $$H_2NC_6H_4C_6H_4NH\underset{\underset{S}{\|}}{C}-S-NH_4$$

Ammonium phenyldithiocarbamate $$C_6H_5NHC(=S)-SNH_4$$

Zinc phenylaminodithiocarbamate $$C_6H_5NHNHC(=S)-SZn-S-C(=S)-NHNHC_6H_5$$

Zinc alpha napthyldithiocarbamate $$a\ C_{10}H_7NHC(=S)-S-Zn-S-C(=S)NHC_{10}H_7\ a$$

Para methylphenyleneammonium para methylphenylenedithiocarbamate $$p\ CH_3C_6H_4NHC(=S)-SH_3NC_6H_4CH_3\ p$$

Ammonium meta methylaminophenyldithiocarbamate $$\begin{matrix}H_3C\\H_2N\end{matrix}\!\!>\!C_6H_3.\ NHC(=S)-S-NH_4$$

Zinc metadiaminomethylphenyldithiocarbamate $$\begin{matrix}H_2N\\H_3C\\H_2N\end{matrix}\!\!>\!C_6H_2.\ NHC(=S)-SZn-S-C(=S)-NH.\ C_6H_2\!<\!\begin{matrix}NH_2\\CH_3\\NH_2\end{matrix}$$

Ammonium para nitrophenylenedithiocarbamate $$p\ NO_2C_6H_4NHC(=S)-SNH_4$$

Ammonium para methylphenylenedithiocarbamate $$p\ CH_3C_6H_4NHC(=S)-SNH_4$$

Zinc para methylphenylenedithiocarbamate $$p\ CH_3C_6H_4NHC(=S)-SZnSC(=S)NHC_6H_4CH_3\ p$$

Ammonium orthomethylphenylenedithiocarbamate $$o\ CH_3C_6H_4NHC(=S)-SNH_4$$

Zinc phenylethylthiocarbamate $$\begin{matrix}C_6H_5\\C_2H_5\end{matrix}\!\!>\!N-C(=O)-S-Zn-S-C(=O)-N\!<\!\begin{matrix}C_6H_5\\C_2H_5\end{matrix}$$

Zinc phenylmethyldithiocarbamate $$\begin{matrix}C_6H_5\\CH_3\end{matrix}\!\!>\!NC(=S)-S-Zn-S-C(=S)-N\!<\!\begin{matrix}C_6H_5\\CH_3\end{matrix}$$

Stannous paramethylphenylenedithiocarbamate $$p.\ CH_3C_6H_4NHC(=S)-SSn/_2$$

Iron phenyldithiocarbamate $$C_6H_5NHC(=S)-SFe/_3$$

Zinc phenyldithiocarbamate $$C_6H_5NHC(=S)-S-Zn/_2$$

Iron ethylphenyldithiocarbamate $$\begin{matrix}C_6H_5\\C_2H_5\end{matrix}\!\!>\!NC(=S)-SFe/_3$$

Barium ethylphenyldithiocarbamate $$\begin{matrix}C_6H_5\\C_2H_5\end{matrix}\!\!>\!NC(=S)-SBa/_2$$

Calcium ethylphenyldithiocarbamate $$\begin{matrix}C_6H_5\\C_2H_5\end{matrix}\!\!>\!NC(=S)-S-Ca/_2$$

Para aminophenyleneammonium para-aminophenylenedithiocarbamate $$p\ NH_2C_6H_4NHC(=S)-SH_3NC_6H_4NH_2\ p$$

Barium orthomethylphenylenedithicarbamate $$(o)\ CH_3C_6H_4NHC(=S)-S-Ba-SC(=S)NHC_6H_4CH_3\ (o)$$

Zinc orthomethylphenylenedithiocarbamate $$(o)\ CH_3C_6H_4NHC(=S)-S-ZnSC(=S)NHC_6H_4CH_3\ (o)$$

Ferric paramethylphenylenedithiocarbamate $$p.\ CH_3C_6H_4NHC(=S)-SFe/_3$$

Barium paramethylphenylenedithiocarbamate $$p.\ CH_3C_6H_4NHC(=S)-S-Ba/_2$$

Calcium paramethylphenylenedithiocarbamate $$p.\ CH_3C_6H_4NHC(=S)-SCa/_2$$

Magnesium ortho methylphenylenedithiocarbamate $$(o)\ CH_3C_6H_4NHC(=S)-SMg/_2$$

Copper ethylphenyldithiocarbamate $$\begin{matrix}C_6H_5\\C_2H_5\end{matrix}\!\!>\!NC(=S)-SCu/_2$$

Zinc methylphenyldithiocarbamate $$\begin{matrix}C_6H_5\\CH_3\end{matrix}\!\!>\!NC(=S)-SZn/_2$$

*Species 14.*

$$NC(=O)SM$$

The following member of this species has been employed to give good results in connection with the process included in this invention:—

Zinc diethylthiocarbamate $$(C_2H_5)_2N\underset{\underset{O}{\|}}{C}-SZn/_2$$

*Species 15.*

$$\underset{\underset{NR}{\|}}{NCSM}$$

The following members of this species have been employed to give good results in connection with the process included in this invention:—

Ethylphenylthiourea $$C_2H_5NH\underset{\underset{NC_6H_5}{\|}}{C}-SH$$

Dimethylphenylthiourea $$(CH_3)_2N\underset{\underset{NC_6H_5}{\|}}{C}-SH$$

It will be understood that the invention disclosed in co-pending application Serial No. 441,691, filed February 1, 1921, may be employed in connection with the accelerators disclosed and included in the invention of the present application.

It is to be understood that rubber substitutes, synthetic rubber, balata, gutta percha, etc., may be similarly treated instead of rubber and it is intended to cover such processes in the claims.

In general the accelerators included in Group 1 given above are obtainable from inexpensive raw materials by simple methods. The members of the group may be readily compounded with rubber or similar material and may be employed generally in vulcanization in thin or thick masses of rubber or in cements. It will be particularly noted that the members of Group 1 are able to accelerate vulcanization at temperatures below the normal vulcanizing temperature, for instance at ordinary room temperature. The ability to vulcanize at such temperature varies somewhat in accordance with the the species selected.

The products obtained provide in general desirable physical characteristics, such as high tensile strength, resistance to ageing, resistance to flexing, etc., and in general are free from the ordor of vulcanizing ingredients. It will thus be seen that among others the objects of the invention above enumerated are achieved.

Although described herein no other species is claimed except those in the set made up of species 5, 6, 7 and 8.

As many apparently widely different embodiments of this invention may be made without departing from the spirit thereof, it will be understood that I do not intend to limit myself to the specific embodiment herein set forth except as indicated in the appended claims.

Each of the substances enumerated herein as members of the various species has been employed in the vulcanization of rubber and has been found to accomplish vulcanization as indicated.

Having thus described my invention, what I claim and desire to protect by Letters Patent is:

1. A process of vulcanizing rubber or similar material which comprises combining with the rubber a vulcanizing agent and an accelerator comprising the radical $$\underset{\underset{X}{\|}}{CCSM}$$

where M is a metal, and vulcanizing the rubber.

2. A process of vulcanizing rubber or similar material which comprises combining with the rubber a vulcanizing agent and an accelerator comprising the radical $$\underset{\underset{X}{\|}}{CCSM'},$$

and vulcanizing the rubber.

3. A process of vulcanizing rubber or similar material which comprises combining with the rubber a vulcanizing agent and an accelerator comprising the radical $$\underset{\underset{S}{\|}}{CCSM},$$

and vulcanizing the rubber.

4. A process of vulcanizing rubber or similar material which comprises combining with the rubber a vulcanizing agent and an accelerator comprising the radical $$\underset{\underset{S}{\|}}{CCSM'},$$

and vulcanizing the rubber.

5. A process of vulcanizing rubber or similar material which comprises combining with the rubber a vulcanizing agent, an accelerator comprising the radical $$\underset{\underset{X}{\|}}{CCSM}$$

where M is a metal, and an amine, and vulcanizing the rubber.

6. A process of vulcanizing rubber or similar material which comprises combining with the rubber a vulcanizing agent, an accelerator comprising the radical $$\underset{\underset{X}{\|}}{CCSM'},$$

and an amine, and vulcanizing the rubber.

7. A process of vulcanizing rubber or similar material which comprises combining with the rubber a vulcanizing agent and an accelerator comprising the radical $$\underset{\underset{X}{\|}}{CCSM'},$$

and vulcanizing the rubber at ordinary temperatures.

8. A process of vulcanizing rubber or similar material which comprises combining with the rubber a vulcanizing agent and an accelerator comprising the radical $$\underset{X}{\overset{CCSM}{\|}}$$

in the presence of combined zinc, and vulcanizing the rubber.

9. A process of vulcanizing rubber or similar material which comprises combining with the rubber a vulcanizing agent and an accelerator comprising the radical $$\underset{S}{\overset{CCSM}{\|}}$$

in the presence of combined zinc, and vulcanizing the rubber.

10. A process of vulcanizing rubber or similar material which comprises combining with the rubber a vulcanizing agent, an accelerator comprising the radical $$\underset{S}{\overset{CCSM}{\|}}$$

in the presence of combined zinc, and an amine, and vulcanizing the rubber.

11. A process of vulcanizing rubber or similar material which comprises combining with the rubber a vulcanizing agent and an accelerator comprising the radical $$\underset{X}{\overset{CCSM}{\|}}$$

in the presence of combined zinc, and vulcanizing the rubber at a temperature below the normal hot vulcanizing temperature.

12. A process of vulcanizing rubber or similar material which comprises combining with the rubber a vulcanizing agent and an accelerator comprising the radical $$\underset{S}{\overset{CCSM}{\|}}$$

in the presence of combined zinc, and vulcanizing the rubber at a temperature below the normal hot vulcanizing temperature.

13. A process of vulcanizing rubber or similar material which comprises combining with the rubber a vulcanizing agent, an accelerator comprising the radical $$\underset{S}{\overset{CCSM}{\|}}$$

in the presence of combined zinc, and an amine, and vulcanizing the rubber at a temperature below the normal hot vulcanizing temperature.

14. A process of vulcanizing rubber or similar material which comprises combining the rubber with sulphur and zinc dithiobenzoate, and vulcanizing the rubber.

15. A process of vulcanizing rubber or similar material which comprises combining the rubber with sulphur, zinc dithiobenzoate, and zinc oxide, and vulcanizing the rubber.

16. A process of vulcanizing rubber or similar material which comprises combining the rubber with sulphur, zinc dithiobenzoate, zinc oxide and para toluidine, and vulcanizing the rubber at ordinary temperatures.

17. A vulcanized rubber derived from rubber or similar material combined with a vulcanizing agent and an accelerator comprising the radical $$\underset{X}{\overset{CCSM}{\|}}$$

where M is a metal.

18. A vulcanized rubber derived from rubber or similar material combined with a vulcanizing agent and an accelerator comprising the radical $$\underset{X}{\overset{CCSM'}{\|}}.$$

19. A vulcanized rubber derived from rubber or similar material combined with a vulcanizing agent and an accelerator comprising the radical $$\underset{S}{\overset{CCSM}{\|}}.$$

20. A vulcanized rubber derived from rubber or similar material combined with a vulcanizing agent and an accelerator comprising the radical $$\underset{S}{\overset{CCSM'}{\|}}.$$

21. A vulcanized rubber derived from rubber or similar material combined with a vulcanizing agent, an accelerator comprising the radical $$\underset{X}{\overset{CCSM}{\|}}$$

where M is a metal, and an amine.

22. A vulcanized rubber derived from rubber or similar material combined with a vulcanizing agent, an accelerator comprising the radical $$\underset{X}{\overset{CCSM'}{\|}},$$

and an amine.

23. A rubber vulcanized at ordinary temperatures derived from rubber or similar material combined with a vulcanizing agent and an accelerator comprising the radical $$\underset{X}{\overset{CCSM'}{\|}}.$$

24. A vulcanized rubber derived from rubber or similar material combined with a vulcanizing agent and an accelerator comprising the radical $$\overset{CCSM}{\underset{X}{\|}}$$

in the presence of combined zinc.

25. A vulcanized rubber derived from rubber or similar material combined with a vulcanizing agent and an accelerator comprising the radical $$\overset{CCSM}{\underset{S}{\|}}$$

in the presence of combined zinc.

26. A vulcanized rubber derived from rubber or similar material combined with a vulcanizing agent, an accelerator comprising the radical $$\overset{CCSM}{\underset{S}{\|}}$$

in the presence of combined zinc, and an amine.

27. A rubber vulcanized at a temperature below the normal hot vulcanizing temperature derived from rubber or similar material combined with a vulcanizing agent and an accelerator comprising the radical $$\overset{CCSM}{\underset{X}{\|}}$$

in the presence of combined zinc.

28. A rubber vulcanized at a temperature below the normal hot vulcanizing temperature derived from rubber or similar material combined with a vulcanizing agent and an accelerator comprising the radical $$\overset{CCSM}{\underset{S}{\|}}$$

in the presence of combined zinc.

29. A rubber vulcanized at a temperature below the normal hot vulcanizing temperature derived from rubber or similar material combined with a vulcanizing agent, an accelerator comprising the radical $$\overset{CCSM}{\underset{S}{\|}}$$

in the presence of combined zinc and an amine.

30. A vulcanized rubber derived from rubber or similar material combined with sulphur and zinc dithiobenzoate.

31. A vulcanized rubber derived from rubber or similar material combined with sulphur, zinc dithiobenzoate, and zinc oxide.

32. A rubber vulcanized at ordinary temperatures derived from rubber or similar material combined with sulphur, zinc dithiobenzoate, zinc oxide and para toluidine.

Signed at New York, this 30th day of March 1922.

SIDNEY M. CADWELL.